US006713525B2

(12) United States Patent
Kashiwame

(10) Patent No.: US 6,713,525 B2
(45) Date of Patent: Mar. 30, 2004

(54) URETHANE (METH) ACRYLATE OLIGOMER, PROCESS FOR ITS PRODUCTION AND PHOTOCURABLE COMPOSITION

(75) Inventor: Josho Kashiwame, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/002,138

(22) Filed: Dec. 5, 2001

(65) Prior Publication Data

US 2002/0068770 A1 Jun. 6, 2002

Related U.S. Application Data

(63) Continuation of application No. PCT/JP00/03776, filed on Jun. 9, 2000.

(30) Foreign Application Priority Data

Jun. 10, 1999 (JP) ............................................ 11-164188

(51) Int. Cl.[7] .............................................. C08G 18/48
(52) U.S. Cl. ........................ 522/97; 526/301; 528/49; 528/75
(58) Field of Search ........................ 522/97; 526/301; 528/49, 75

(56) References Cited

U.S. PATENT DOCUMENTS

| 4,985,491 | A | | 1/1991 | Reisch |
| 5,068,304 | A | | 11/1991 | Higuchi et al. |
| 5,811,829 | A | | 9/1998 | Lawrey et al. |
| 6,197,459 | B1 | * | 3/2001 | Leach |
| 6,214,522 | B1 | | 4/2001 | Leach |
| 6,242,555 | B1 | * | 6/2001 | Du Prez |
| 6,503,997 | B1 | | 1/2003 | Saito et al. |

FOREIGN PATENT DOCUMENTS

| EP | 0 874 012 | 10/1998 |
| JP | 11-50045 | 2/1999 |

OTHER PUBLICATIONS

Saunders et al.; Polyurethanes; Part I; 1962; p. 44.*

* cited by examiner

Primary Examiner—Rachel Gorr
(74) Attorney, Agent, or Firm—Oblon, Spivak, McClelland, Maier & Neustadt, P.C.

(57) ABSTRACT

A urethane (meth)acrylate oligomer which has a low viscosity and gives a flexible cured article reduced in surface tackiness. It is obtained by reacting a polyol ingredient comprising a polyoxyalkylene polyol which has two to four hydroxyl groups, a hydroxyl value $V_{OH}$ (mg-KOH/g) of from 5 to 115, and a total degree of unsaturation $V_{US}$ (meq/g) satisfying the relationship $V_{US} \leq (0.45/V_{OH})+0.02$, with a polyisocyanate compound and a hydroxylated (meth) acrylate compound.

13 Claims, No Drawings

URETHANE (METH) ACRYLATE OLIGOMER, PROCESS FOR ITS PRODUCTION AND PHOTOCURABLE COMPOSITION

BACKGROUND OF THE INVENTION

1. Field of the Invention

The present invention relates to a urethane (meth)acrylate oligomer, a process for its production and a photo-curable composition. Particularly, it relates to a urethane (meth) acrylate oligomer which has a low viscosity and which gives a cured product excellent in flexibility and adhesive property and having a low surface stickiness (hereinafter referred to as a surface tackiness), a process for its production and a photo-curable composition containing such an oligomer.

2. Description of the Background

In recent years, in all technical fields, energy saving, resource saving and environmental measures have become important subjects, and various technical developments have been made. As one of them, a photo-curable resin composition has been developed and used in applications to e.g. coating materials, adhesives, coating agents, printing ink vehicles, resist inks, relief printing plate materials, optical fiber coating materials and optical shaping materials. Such a photo-curable resin composition comprises a photo-curable oligomer, a photo-polymerizable monomer, a photo-polymerization initiator, a sensitizer, a colorant and other additives and contains substantially no volatile solvent, and it undergoes a curing reaction by irradiation with light rays having a certain specific wavelength to give a cured product excellent in flexibility and adhesive properties.

The photo-curable oligomer to be used here, is usually one having from one to several (meth)acryloyl groups as photo-curable functional groups in its molecular structure. Among such oligomers, a urethane (meth)acrylate oligomer obtainable by reacting a polyol and a polyisocyanate compound, is used in a wide range of fields, as its cured product exhibits excellent performance in the toughness, hardness, chemical resistance, flexibility, adhesive property, light resistance, low temperature characteristics, etc.

With respect to such a urethane (meth)aczylate oligomer, molecular designing can easily be done by changing the starting material variously depending upon the particular purpose of its use. Especially, it is easy to change the performance by the polyol to be used. When a low molecular weight polyol having a molecular weight of about a few hundreds, is used, a hard and brittle cured product will be obtained, and when a high molecular weight polyol having a molecular weight of from a thousand to a few thousands, is employed, a flexible and tough cured product will be obtained. As such a high molecular weight polyol, a polyoxyalkylene polyol, a polyester polyol, a polycaprolactone polyol or a polycarbonate polyol is, for example, employed.

However, if a high molecular weight polyol is used, the viscosity of the resulting urethane (meth)acrylate oligomer will be high, and it has been difficult to let the urethane moiety have a high molecular weight so as to obtain sufficient flexibility. Further, because of the high viscosity, there has been a problem in working efficiency, and as shown in JP-A-9-48830, it used to be necessary to employ a low molecular weight (meth)acrylate compound as a viscosity-reducing agent.

As a low viscosity polyol, a polyoxyalkylene polyol is known. However, if a common polyoxyalkylene polyol as shown in JP-A-10-95640 is used, since such a polyol contains a substantial amount of a by-product monool, the curing tends to be slow, and there has been a problem that no adequate physical properties can be obtained, or the surface tackiness of the cured product remains.

SUMMARY OF THE INVENTION

Under these circumstances, the present inventors have conducted an extensive study, and as a result, have found it possible to obtain a photo-curable composition which has a low viscosity and excellent curability and which gives a cured product having little surface tackiness, by employing a certain specific urethane (meth)acrylate oligomer based on a polyoxyalkylene polyol having a low total degree of unsaturation (i.e. a small monool content). The present invention has been accomplished on the basis of this discovery.

DETAILED DESCRIPTION OF THE PREFERRED EMBODIMENTS

The present invention has been made to solve the above-mentioned problems. In the first aspect, the present invention provides a urethane (meth)acrylate oligomer obtainable by reacting a polyol component (A) comprising a polyoxyalkylene polyol which has from 2 to 4 hydroxyl groups, a hydroxyl value $V_{OH}$ (mgKOH/g) of from 5 to 115 and a total degree of unsaturation $V_{US}$ (meq/g) satisfying the formula 1, with a polyisocyanate compound (B) and a hydroxylated (meth)acrylate compound (C):

$$V_{US} \leq (0.45/V_{OH}) + 0.02 \qquad \text{Formula 1}$$

In the second aspect, the present invention further provides a photo-curable composition comprising the above urethane (meth)acrylate oligomer and a photo-polymerization initiator.

In this specification, "(meth)acrylate" is used as a general term representing "acrylate" and "methacrylate".

The polyoxyalkylene polyol which has from 2 to 4 hydroxyl groups, a hydroxyl value $V_{OH}$ (mgKOH/g) of from 5 to 115 and a total degree of unsaturation $V_{US}$ (meq/g) satisfying the formula 1, to be used in the present invention, can be obtained usually by employing diethyl zinc, iron chloride, metal porphyrin, a double metal cyanide complex, a cesium compound or the like, as a catalyst. Especially preferred is one obtained by using a double metal cyanide complex. In the case of a commonly employed alkali metal such as potassium hydroxide, the unsaturated degree tends to be high especially with a high molecular weight product, such being undesirable.

The double metal cyanide complex may preferably be a complex comprising zinc hexacyanocobaltate as the main component, particularly preferably its ether and/or alcohol complex. As its composition, one disclosed in JP-B-46-27250 can essentially be employed. As the ether, an ethylene glycol dimethyl ether (glyme) or a diethylene glycol dimethyl ether (diglyme) may, for example, be preferred, and particularly preferred is glyme from the handling efficiency for the production of the complex. As the alcohol, t-butanol or t-butylcellosolve may, for example, be preferred.

The polyoxyalkylene polyol in the present invention, is produced by reacting a polyfunctional initiator with a monoepoxide in the presence of the above-mentioned catalyst. The monoepoxide is a compound having one epoxy ring, such as an alkylene oxide, glycidyl ether or glycidyl ester. As a preferred monoepoxide, ethylene oxide, propylene oxide, 1,2-butylene oxide, 2,3-butylene oxide, or styrene oxide may be mentioned. Particularly preferred is ethylene oxide or propylene oxide. These monoepoxides may be used in combination as a mixture of two or more of them.

The number of hydroxyl groups of such a polyoxyalkylene polyol is from 2 to 4, preferably from 2 to 3. Namely, as the initiator, a compound having from 2 to 4 active hydrogen atoms, is used. As the initiator, a polyhydroxy compound having from 2 to 4 hydroxyl groups is preferred, and particularly preferred is a polyhydroxy compound having from 2 to 3 hydroxyl groups. Specifically, ethylene glycol, diethylene glycol, propylene glycol, dipropylene glycol, neopentyl glycol, 1,4-butandiol, 1,6-hexane diol, glycerol, trimethylol propane, pentaerythritol, and a polyol having a molecular weight lower than the desired product, obtained by reacting an alkylene oxide thereto, may be mentioned. These polyhydroxy compounds may be used alone or in combination as a mixture of two or more of them. The hydroxyl value $V_{OH}$ (mgKOH/g) of the polyoxyalkylene polyol is from 5 to 115, preferably from 7 to 80, more preferably from 9 to 30. With a hydroxyl value higher than this, no adequate flexibility can be obtained, and with a lower hydroxyl value, no adequate strength will be obtained. The total degree of unsaturation $V_{US}$ (meq/g) of the polyoxyalkylene polyol is required to satisfy the formula 1 relating to the hydroxyl value $V_{OH}$ (mgKOH/g), preferably satisfies the formula 2, more preferably satisfies the formula 3.

$$V_{US} \leq (0.45/V_{OH})+0.02 \quad \text{Formula 1}$$

$$V_{US} \leq (0.45/V_{OH})+0.01 \quad \text{Formula 2}$$

$$V_{US} \leq (0.45/V_{OH}) \quad \text{Formula 3}$$

If the total degree of unsaturation is higher than this, an increase in the surface tackiness of the cured product or a decrease in the curing property, are observed, such being undesirable.

As the polyol component (A) in the present invention, the above-mentioned polyoxyalkylene alkylene polyol is mainly used, but in some cases, it may be used in combination with other polyoxyalkylene polyols.

The polyisocyanate compound (B) in the present invention may be an aromatic, aliphatic or aromatic ring-containing aliphatic isocyanate having at least two isocyanate groups on average, or an isocyanate of modified polyisocyanate type obtained by modification thereof.

Specifically, it may be a polyisocyanate such as tolylene diisocyanate, diphenylmethane diisocyanate, polymethylenepolyphenylene isocyanate (crude MDI), xylylene diisocyanate, isophorone diisocyanate or hexamethylene diisocyanate, or its prepolymer-modified product, isocyanurate modified product, urea-modified product or carbodiimide modified product. Among them, a diisocyanate having two isocyanate groups in one molecule, is preferred. These polyisocyanate compounds may be used alone or in combination as a mixture of two or more of them.

The hydroxylated (meth)acrylate compound (C) in the present invention may preferably be a hydroxyalkyl (meth)acrylate wherein the carbon number of the alkyl group moiety is from 1 to 10, particularly preferably a hydroxyalkyl (meth)acrylate wherein the carbon number of the alkyl group moiety is from 1 to 5. Particularly preferred among them is a hydroxyalkyl acrylate. Specifically, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, pentandiol mono(meth)acrylate or hexanediol mono(meth)acrylate may, for example, be mentioned, and 2-hydroxyethyl (meth)acrylate or 2-hydroxypropyl (meth)acrylate is particularly preferred. 2-Hydroxyethyl acrylate or 2-hydroxypropyl acrylate is most preferred. These hydroxylated (meth)acrylate compounds may be used alone or in combination as a mixture of two or more of them.

The present invention provides a process for producing a urethane (meth)acrylate oligomer, which comprises reacting the above-mentioned polyol component (A), the polyisocyanate compound (B) and the hydroxylated (meth)acrylate compound (C). Specifically, the following methods (1) to (3) may be mentioned.

(1) A method in which the polyol component (A), the polyisocyanate compound (B) and the hydroxylated (meth)acrylate compound (C) are reacted simultaneously.

(2) A method wherein the polyisocyanate compound (B) of the formula 2 and the hydroxylated (meth)acrylate compound (C) are reacted under such a condition that the isocyanate group is stoichiometrically excessive, and the obtained reaction product is further reacted with the polyol component (A).

(3) A method wherein the polyol component (A) and the polyisocyanate compound (B) are reacted under such a condition that the isocyanate group is stoichiometrically excessive, and the obtained reaction product is further reacted with the hydroxylated (meth)acrylate compound (C).

In the present invention, the method (3) is particularly preferred. Namely, particularly preferred is a method in which the polyol component (A) containing a polyoxyalkylene polyol, and the polyisocyanate compound (B) are reacted under such a condition that the isocyanate group is stoichiometrically excessive, to obtain a urethane prepolymer having a terminal isocyanate group, and then the hydroxylated (meth)acrylate compound (C) is reacted to the terminal isocyanate group of the urethane prepolymer.

At that time, the proportions of the polyol component (A) and the polyisocyanate compound (B) are preferably such that the molar ratio of the isocyanate group: the hydroxyl group is from 1.3:1 to 3:1, more preferably from 1.5:1 to 2:1.

The reaction is preferably carried out at a temperature for a common urethane-modification reaction i.e. from 30 to 90° C. At the time of the reaction, a urethane-modification catalyst such as cobalt naphthenate, zinc naphthenate, lead 2-ethylhexanoate, dibutyltin dilaurate, tin 2-ethylhexanoate, triethylamine or 1,4-diazabicyclo[2.2.2]octane, may be used.

The reaction of the urethane prepolymer having a terminal isocyanate group with the hydroxylated (meth)acrylate compound (C) is carried out preferably in such a proportion that the molar ratio of the terminal isocyanate group to the hydroxyl group will be from 1:1 to 1:1.5. The temperature for the reaction is preferably from 30 to 90° C. At the time of the reaction, a polymerization inhibitor may be added in order to control the thermal polymerization reaction of the (meth)acryloyl group. As a preferred polymerization inhibitor, hydroquinone, hydroquinone monomethyl ether or o-nitrotoluene, may, for example, be mentioned. Such a polymerization inhibitor is used within a range of from 50 to 5,000 ppm relative to the hydroxylated (meth)acrylate compound (C).

In the second aspect, the present invention provides a photo-curable composition comprising the urethane (meth)acrylate oligomer obtainable as described above, and a photo-polymerization initiator.

The photo-polymerization initiator is not particularly limited, so long as it is one which can be used for conventional photo-curable compositions, and for example, benzophenone, 4-chlorobenzophenone, 4,4'-dimethoxybenzophenone, 4,4'-diaminobenzophenone, acetophenone, 3-methylacetophenone, benzoine, benzoine isobutyl ether, benzoine isopropyl ether, benzoine ethyl ether, anthraquinone, 1-hydroxycyclohexylphenyl ketone or 2-hydroxy-2-methyl-1-phenylpropan-1-one, may be mentioned.

Such a photo-polymerization initiator can be used within a range of from 0.1 to 10 parts by weight, preferably within a range of from 1 to 5 parts by weight, per 100 parts by total weight of the urethane (meth)acrylate oligomer.

For the purpose of adjusting the physical properties of the resulting cured product, the composition of the present invention may contain, in addition to the above-mentioned urethane (meth)acrylate oligomer, a urethane (meth)acrylate oligomer obtainable from a polyol other than the polyol component specified in the present invention. As such a polyol, polyoxytetramethylene polyol, polyester polyol, polycaprolactone polyol, polycarbonate polyol or polybutadiene polyol, may, for example, be mentioned.

Further, for the composition of the present invention, for the purpose of lowering the viscosity, the following ethylenically unsaturated group-containing compound may be used as a diluting agent. As such an ethylenically unsaturated group-containing compound, in addition to the above-mentioned hydroxylated (meth)acrylate compound (C) such as 2-hydroxyethyl(meth)acrylate, a (meth)acrylate compound containing no hydroxyl group, such as an alkyl (meth)acrylate such as methyl (meth)acrylate or ethyl (meth) acxylate, pbenoxyethyl (meth)acrylate or isobornyl (meth) acrylate, or a vinyl ether monomer such as hydroxybutyl vinyl ether, lauryl vinyl ether or 2-ethylhexyl vinyl ether, may be mentioned. The urethane (meth)acrylate oligomer of the present invention has a low viscosity by itself, and in many cases, such a diluting agent may not be required. It is preferred not to use such a diluting agent.

The photo-curable composition of the present invention is used in applications to e.g. coating materials, adhesives, coating agents, printing ink vehicles, resist inks, relief printing plate materials, optical fiber coating materials and optical shaping materials, and it can be photo-cured to provide a cured product which has flexibility and little surface tackiness.

EXAMPLES

Now, the present invention will be described in detail with reference to Examples (Examples 1 to 4) and Comparative Examples (Comparative Examples 5 and 6), but the present invention is by no means restricted to such Examples.

Preparation of a Polyoxyalkylene Polyol

Polyol A, C: Is prepared by reacting propylene oxide to an initiator (a polyoxypropylene diol having a molecular weight of 700) using zinc hexacyanocobaltate-glyme complex as a catalyst, and then, deactivating the catalyst, followed by purification.

Polyol B: One is prepared by reacting propylene oxide to an initiator (a polyoxypropylene diol having a molecular weight of 700) using zinc hexacyanocobaltate-glyme complex as a catalyst, then reacting ethylene oxide, then deactivating the catalyst, followed by purification. The oxyethylene group-content is 20 wt %.

Polyol D: Is prepared by reacting propylene oxide to an initiator (a polyoxypropylene triol having a molecular weight of 1,000) using zinc hexacyanocobaltate-glyme complex as a catalyst, then deactivating the catalyst followed by purification.

Polyol E: Is prepared by reacting propylene oxide to an initiator (a polyoxypropylene diol having a molecular weight of 700) zinc hexacyanocobaltate-t-butanol complex as a catalyst, then deactivatin the catalyst follow purification.

Polyol F: Is prepared by reacting propylene oxide to an initiator (a polyoxypropylene diol having a molecular weight of 700) using potassium hydroxide as a catalyst, followed by purification. In Table 1, the number of hydroxyl groups, the hydroxyl values $V_{OH}$ (mgKOH/g), the total degrees of unsaturation $V_{US}$ (meq/g) and values x (x=(0.45/$V_{OH}$)+0.02) are shown.

TABLE 1

|  | Hydroxyl group | Hydroxyl value | Total degree of unsaturation | x |
|---|---|---|---|---|
| Polyol A | 2 | 28 | 0.026 | 0.036 |
| Polyol B | 2 | 28 | 0.018 | 0.036 |
| Polyol C | 2 | 11 | 0.034 | 0.061 |
| Polyol D | 3 | 17 | 0.029 | 0.046 |
| Polyol E | 2 | 28 | 0.006 | 0.036 |
| Polyol F | 2 | 28 | 0.124 | 0.036 |

Preparation of a Urethane Acrylate Oligomer

Example 1

To 100 parts by weight (hereinafter referred to simply as parts) (0.025 mol) of polyol A, 8.7 parts (0.05 mol) of tolylene diisocyanate (T-100, tradename, manufactured by Nippon Polyurethane Industry Co., Ltd.) is added, followed by a reaction at 80° C. for 4 hours in the presence of 0.01 part of dibutyltin dilaurate, to obtain a urethane prepolymer. To this urethane prepolymer, 0.05 part of dibutyltin dilaurate and 0.05 part of hydroquinone monomethyl ether is added, and 6.38 parts (0.055 mol) of 2-hydroxyethyl acrylate is dropwise added at 40 °C. Thereafter, a reaction is carried out at 60 °C. until absorption by an isocyanate group at a wavelength of 2,250 cm$^{-1}$ in the infrared absorption spectrum is no longer observed, to obtain a urethane acrylate oligomer.

Example 2

A urethane acrylate oligomer is obtained in the same manner as in Example 1 except that polyol B is used instead of polyol A.

Example 3

A urethane acrylate oligomer is obtained in the same manner as in Example 1 except that instead of 100 parts of polyol A, a mixture comprising 182 parts (0.0182 mol) of polyol C and 45 parts (0.0045 mol) of polyol D, is used, to obtain a urethane acrylate oligomer.

Example 4

A urethane acrylate oligomer is obtained in the same manner as in Example 1 except that instead of polyol A, polyol E is used.

Example 5

A urethane acrylate oligomer is obtained in the same manner as in Example 1 except that instead of polyol A, polyol F is used.

Example 6

A urethane acrylate oligomer is obtained in the same manner as in Example 1 except that instead of 100 parts of polyol A, 50 parts (0.025 mol) of polyoxytetramethylene glycol having a molecular weight of 2,000, is used, to obtain a urethane acrylate oligomer.

Evaluation

Examples 1 to 6 may be evaluated by the following methods. The results possible are shown in Table 2.

Viscosity

The viscosity (cP) at 25° C. is measured by means of an E-type rotary viscometer.

Surface Tacking and Mechanical Properties of a Cured Product

To 100 parts of the urethane acrylate oligomer in each of Examples 1 to 6, 3 parts of benzophenone and 1 part of 2-hydroxy-2-methyl-1-phenylpropan-1-one is added and thoroughly is mixed at 60° C., to obtain a photo-curable composition. The obtained photo-curable composition is coated on an OPP film (Oriented polypropylene film) bonded to a glass plate by means of an applicator of 8 mil and is irradiated for 5 seconds by a high pressure mercury lamp having an output of 80 W/cm from a height of 15 cm, to obtain a cured film.

The surface tackiness of the cured film is evaluated by touching with a finger. Evaluation of the surface tackiness is made based on the following standards. ⊚: No tackiness, ○: no substantial tackiness, Δ: slight tackiness, and x: substantial tackiness.

Further, the mechanical properties of the film i.e. the tensile strength (unit: kg/cm$^2$) and the break elongation (unit: %), is measured in accordance with JIS K6301.

TABLE 2

| | | | Mechanical properties | |
|---|---|---|---|---|
| Example | Viscosity | Surface tackiness | Tensile strength | Break elongation |
| 1 | 5400 | ○ | 55 | 370 |
| 2 | 5900 | ○-⊚ | 68 | 420 |
| 3 | 8200 | Δ-○ | 43 | 560 |
| 4 | 5600 | ⊚ | 74 | 320 |
| 5 | 4800 | X | 22 | 690 |
| 6 | 28000 | ⊚ | 97 | 210 |

INDUSTRIAL APPLICABILITY

The urethane (meth)acrylate oligomer employing a polyoxyalkylene polyol having a low total degree of unsaturation, according to the present invention, has a low viscosity as compared with one employing other polyols, and its photo-cured product is excellent in flexibility and exhibits a remarkable effect such that the surface tackiness is low as compared with one employing a conventional polyoxyalkylene polyol having a high total degree of unsaturation.

The entire disclosure of Japanese Patent Application No. 11-164188 filed on Jun. 10, 1999 including specification, claims and summary are incorporated herein by reference in its entirety.

What is claimed is:

1. A urethane (meth)acrylate oligomer obtained by reacting a polyol component (A) consisting of a polyoxypropylene polyol which has from 2 to 4 hydroxyl groups, a hydroxyl value $V_{OH}$ (mgKOH/g) of from 9 to 17 and a total degree of unsaturation $V_{US}$ (meq/g) satisfying the formula 1, with a polyisocyanate compound (B) and a hydroxylated (meth)acrylate compound (C):

$$V_{US} \leq (0.45/V_{OH}) + 0.02 \qquad \text{Formula 1.}$$

2. The oligomer according to claim 1, wherein the polyoxypropylene polyol is a polyoxypropylene polyol obtained by reacting an propylene oxide to an initiator by means of a double metal cyanide complex as a catalyst.

3. A process for producing a urethane (meth)acrylate oligomer, which comprises reacting a polyol component (A) consisting of a polyoxypropylene polyol which has from 2 to 4 hydroxyl groups, a hydroxyl value $V_{OH}$ (mgKOH/g) of from 9 to 17 and a total degree of unsaturation $V_{US}$ (meq/g) satisfying the formula 1, with a polyisocyanate compound (B) and a hydroxylated (meth)acrylate compound (C):

$$V_{US} \leq (0.45/V_{OH}) + 0.02 \qquad \text{Formula 1.}$$

4. The process for producing the oligomer according to claim 3, wherein the polyol component (A) and the polyisocyanate compound (B) are reacted under such a condition that the isocyanate group is stoichiometrically excessive, and then, the obtained reaction product is reacted with the hydroxylated (meth)acrylate compound (C).

5. A photo-curable composition comprising the oligomer as defined in claim 1 and a photo-polymerization initiator.

6. The urethane (meth)acrylate oligomer according to claim 1, wherein the polyoxyalkylene polyol has a total degree of unsaturation, $V_{US}$ (meq/g), satisfying the formula 2:

$$V_{US} \leq (0.45/V_{OH}) + 0.01 \qquad \text{formula 2.}$$

7. The urethane (meth)acrylate oligomer according to claim 1, wherein the polyoxyalkylene polyol has a total degree of unsaturation, $V_{US}$ (meq/g), satisfying the formula 3:

$$V_{US} \leq (0.45/V_{OH}) \qquad \text{formula 3.}$$

8. The urethane (meth)acrylate oligomer according to claim 1, wherein the hydroxylated (meth)acrylate compound (C) comprises hydroxyalkyl acrylate, wherein the alkyl group is $C_1$–$C_{10}$ alkyl.

9. The urethane (meth)acrylate oligomer according to claim 8, wherein the alkyl group is $C_1$–$C_6$ alkyl.

10. The urethane (meth)acrylate oligomer according to claim 9, which is 2-hydroxyethyl acrylate or 2-hydroxypropyl acrylate.

11. The urethane (meth)acrylate oligomer according to claim 1, having a viscosity of from 5400 to 8200.

12. A cured urethane (meth)acrylate oligomer according to claim 1, having a tensile strength of from 43 to 74 kg/cm$^2$.

13. A cured urethane (meth)acrylate oligomer according to claim 1, having a break elongation of from 320 to 560%.

* * * * *